(12) United States Patent
Abd El Salam Mohamed et al.

(10) Patent No.: US 11,920,321 B2
(45) Date of Patent: Mar. 5, 2024

(54) SYSTEM AND METHOD FOR AUTOMATICALLY PERFORMING AN EARTHMOVING OPERATION

(71) Applicant: CNH Industrial America LLC, New Holland, PA (US)

(72) Inventors: Mohamed Abd El Salam Mohamed, Forlimpopoli (IT); Alessandro Benevelli, Reggio Nell'Emilia (IT); Domenico Meola, Lauriano (IT); Scott Elkins, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 650 days.

(21) Appl. No.: 16/834,006

(22) Filed: Mar. 30, 2020

(65) Prior Publication Data

US 2021/0301493 A1   Sep. 30, 2021

(51) Int. Cl.
  *E02F 3/43* (2006.01)
  *G05D 1/00* (2006.01)

(52) U.S. Cl.
  CPC ............. *E02F 3/434* (2013.01); *E02F 3/437* (2013.01); *G05D 1/0088* (2013.01); *G05D 2201/0202* (2013.01)

(58) Field of Classification Search
  CPC . E02F 3/437; E02F 3/434; E02F 9/265; E02F 9/262; G05D 1/0088; G05D 2201/0202
  USPC .......................................................... 701/50
  See application file for complete search history.

(56) References Cited

U.S. PATENT DOCUMENTS

| 5,065,326 | A |   | 11/1991 | Sahm |
| 5,446,980 | A |   | 9/1995 | Rocke |
| 5,854,988 | A | * | 12/1998 | Davidson .................. E02F 9/26 701/50 |
| 5,933,346 | A | * | 8/1999 | Brabec .................. E02F 9/2025 340/684 |
| 6,371,214 | B1 | * | 4/2002 | Anwar .................... E02F 3/434 701/50 |

(Continued)

FOREIGN PATENT DOCUMENTS

| CN | 108797669 A | 11/2018 |
| DE | 10028606 A1 | 2/2001 |
| JP | 2019157362 A | 9/2019 |

OTHER PUBLICATIONS

Extended European Search Report for EP Application No. 21165755.6 dated Sep. 16, 2021 (eight pages).

*Primary Examiner* — Krishnan Ramesh
(74) *Attorney, Agent, or Firm* — Rickard K. DeMille; Rebecca L. Henkel; Peter K. Zacharias (57) ABSTRACT

A system for automatically performing an earthmoving operation may include a work vehicle having an implement that is articulable by the work vehicle over a stroke length, a user interface, and a controller communicatively coupled to the user interface. The controller may be configured to receive an operator input via the user interface associated with performing an earthmoving operation with the implement of the work vehicle according to one of a plurality of earthmoving styles. Additionally, the controller may be configured to control the operation of the work vehicle to perform the earthmoving operation with the implement within the worksite based at least in part on the one of the plurality of earthmoving styles.

20 Claims, 4 Drawing Sheets

(56) References Cited

U.S. PATENT DOCUMENTS

| | | | |
|---|---|---|---|
| 6,823,616 B1* | 11/2004 | Gutter | E02F 9/2041 |
| | | | 294/68.23 |
| 7,865,285 B2 | 1/2011 | Price et al. | |
| 2005/0131610 A1* | 6/2005 | Sahm | E02F 3/431 |
| | | | 701/50 |
| 2008/0097672 A1* | 4/2008 | Clark | E02F 9/2029 |
| | | | 701/50 |
| 2016/0076222 A1* | 3/2016 | Taylor | E02F 9/2045 |
| | | | 701/50 |
| 2017/0200306 A1* | 7/2017 | Marsolek | G06T 17/05 |
| 2017/0284070 A1* | 10/2017 | Matsuyama | E02F 9/20 |
| 2018/0135273 A1* | 5/2018 | Tsuji | E02F 3/434 |
| 2018/0179732 A1 | 6/2018 | Bartsch et al. | |
| 2020/0032490 A1* | 1/2020 | Ready-Campbell | |
| | | | G05D 1/0274 |
| 2020/0208373 A1* | 7/2020 | Nakamura | E02F 9/24 |
| 2021/0010229 A1* | 1/2021 | Sano | E02F 3/436 |
| 2021/0108395 A1* | 4/2021 | Harada | E02F 9/2045 |
| 2021/0148086 A1* | 5/2021 | Ready-Campbell | |
| | | | G05D 1/0246 |
| 2021/0148090 A1* | 5/2021 | Hashimoto | E02F 9/20 |
| 2021/0222405 A1* | 7/2021 | Velde | E02F 9/2033 |
| 2021/0301493 A1* | 9/2021 | Abd El Salam Mohamed | |
| | | | E02F 3/437 |
| 2022/0049473 A1* | 2/2022 | Takaoka | E02F 9/262 |
| 2022/0282451 A1* | 9/2022 | Ready-Campbell | |
| | | | G05D 1/0016 |

\* cited by examiner

SYSTEM AND METHOD FOR AUTOMATICALLY PERFORMING AN EARTHMOVING OPERATION

FIELD OF THE INVENTION

The present disclosure relates generally to work vehicles, such as excavators and backhoes, and, more particularly, to systems and methods for automatically performing an earthmoving operation with a work vehicle according to one or more preset earthmoving styles.

BACKGROUND OF THE INVENTION

A wide variety of work vehicles, such as excavators, loaders, shovels, bull-dozers, and/or the like, have been developed for performing various tasks of earthmoving operations, such as carrying loads, moving earth, digging, dumping, and/or the like, at a worksite. These work vehicles have implements, such as buckets, claws, and/or the like of varying sizes, which are selected based on the site and task requirements. A machine operator may control the operation of the work vehicle to perform the various worksite tasks. However, such tasks are often repetitive and time-consuming, which causes operator fatigue and high operating costs. As such, it is desirable to automate as much of the repetitive tasks as possible.

Current automated work vehicles perform many of the repetitive tasks based on applied forces and efficiency calculations. However, such automated vehicles are not capable of automatically performing all of the variations of such repetitive tasks that an operator would otherwise perform depending on the worksite requirements.

Accordingly, an improved system and method for automatically excavating a worksite would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for automatically performing an earthmoving operation. The system may include a work vehicle having an implement, the implement being articulable by the work vehicle over a stroke length. The system may further include a user interface and a controller communicatively coupled to the user interface. The controller may be configured to receive an operator input via the user interface associated with performing an earthmoving operation with the implement of the work vehicle according to one of a plurality of earthmoving styles. Additionally, the controller may be configured to control the operation of the work vehicle to perform the earthmoving operation with the implement based at least in part on the one of the plurality of earthmoving styles.

In another aspect, the present subject matter is directed to a method for automatically performing an earthmoving operation with a work vehicle, where the work vehicle has an implement that is articulable over a stroke length. The method includes receiving, with the computing device, an operator input via a user interface associated with performing an earthmoving operation with the implement of the work vehicle according to one of a plurality of earthmoving styles. Additionally, the method includes controlling, with the computing device, the operation of the work vehicle to perform the earthmoving operation with the implement based at least in part on the one of the plurality of earthmoving styles.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for automatically performing an earthmoving operation. Specifically, in several embodiments, the disclosed system includes a work vehicle having an articulable implement, such as a bucket or claw, that is movable over a full stroke length for each position of the work vehicle. The implement is controlled by a controller to automatically perform an earthmoving operation according to a preset style selected from a plurality of preset styles by an operator of the work vehicle. Each of the plurality of preset styles is associated with a pattern for filling and emptying the implement. Particularly, the plurality of preset styles may include implement-fill styles and earth-breaking styles. When the implement performs earthmoving operations using implement-fill styles, the implement is controlled to remove one implement load of worksite materials at a time either across successive depth layers or down to a desired grade at successive positions along the stroke length. When the implement performs earthmoving operations using earth-breaking styles, the implement is controlled to collect worksite materials across a given portion of the stroke length before being unloaded, with the implement being filled before or at the end of the given portion of the stroke length. Additionally, in some embodiments, the disclosed system may include a vision-based sensor which is used to monitor the filling and emptying of the implement according to such preset styles. Further, such vision-based sensor may be used to monitor the progress of the earthmoving operations.

Figure 1:
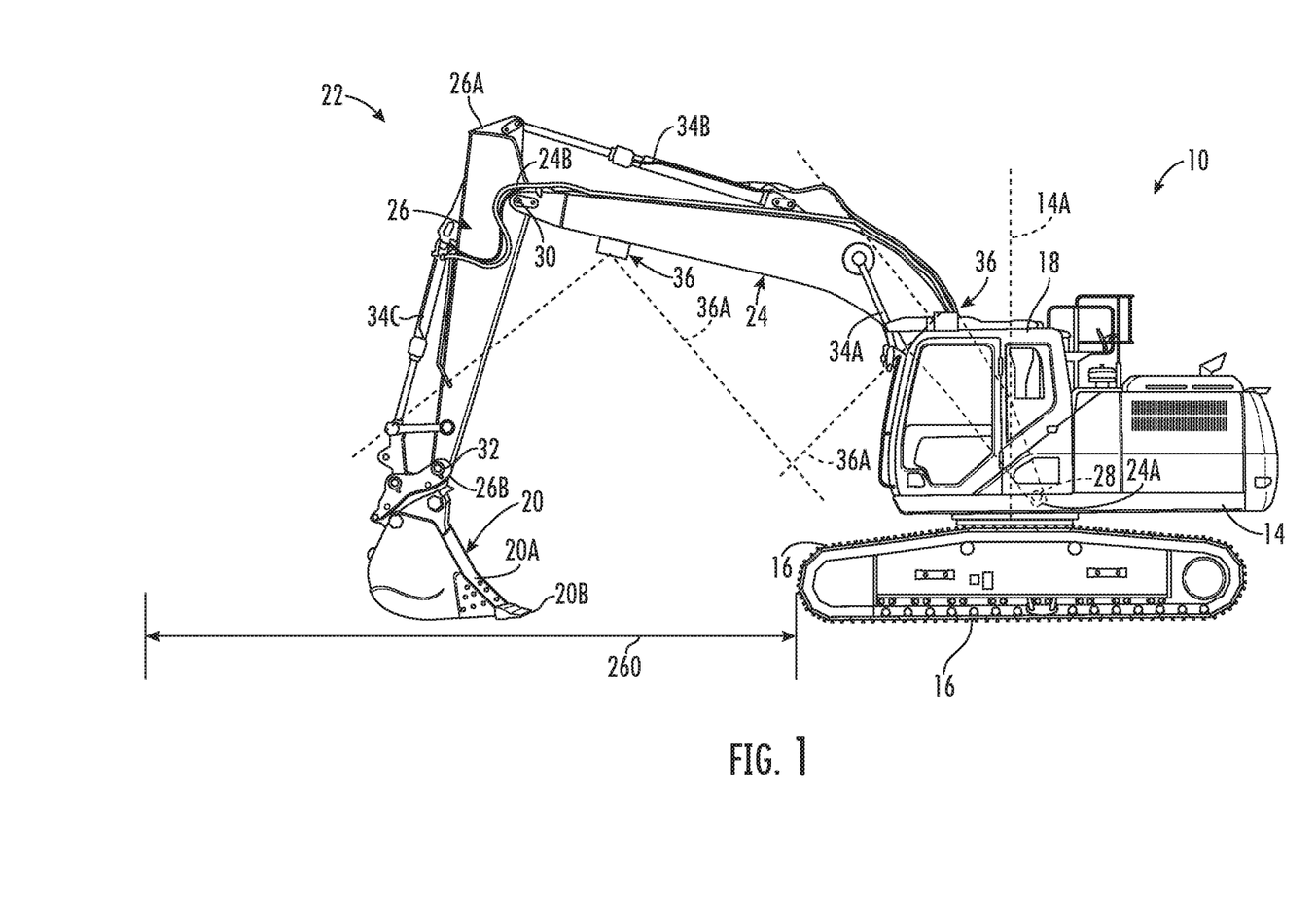
FIG. 1 illustrates a illustrates a side view of one embodiment of a work vehicle in accordance with aspects of the present subject matter.

Referring now to drawings, FIG. 1 illustrates a perspective view of one embodiment of a work vehicle 10. As shown, the work vehicle 10 is configured as an excavator. However, in other embodiments, the work vehicle 10 may be configured as any other suitable work vehicle, such as a loaders, shovels, bull-dozers, and/or the like.

As shown in FIG. 1, the work vehicle 10 includes a frame or chassis 14 coupled to and supported by a pair of tracks 16 for movement across a worksite. However, in other embodiments, the chassis 14 may be supported in any other way, for example by wheels, a combination of wheels and tracks, or a fixed platform. In some embodiments, an operator's cab 18 may be supported by a portion of the chassis 14 and may house a user interface 60 (FIG. 2) comprising various input devices for permitting an operator to control the operation of one or more components of the work vehicle 10. However, it should be appreciated that, in some embodiments, one or more components of the user interface 60 may be positioned remotely from the work vehicle 10. Additionally, the work vehicle 10 includes an implement 20 articulable relative to the chassis 14 for performing earth moving operations within a worksite. The chassis 14 may, in some embodiments, be configured such that the operator's cab 18 and/or the articulable implement 20 is rotatable about a chassis axis 14A.

More particularly, the implement 20 is part of a linkage assembly 22 comprising a boom arm 24 and a dipper arm 26. The boom arm 24 extends between a first end 24A and a second end 24B. Similarly, the dipper arm 26 extends between first end 26A and a second end 26B. The first end 24A of the boom arm 24 is pivotably coupled to the chassis 14 about a first pivot axis 28, and the second end 24B of the boom arm 24 is pivotably coupled to the first end 26A of the dipper arm 26 about a second pivot axis 30. Further, the implement 20 is pivotably coupled to the second end 26B of the dipper arm 26 about a third pivot axis 32. The implement 20, in one embodiment, is configured as a bucket having a cavity 20A and a plurality of teeth 20B, where the teeth 20B help to break up worksite materials for collection within the cavity 20A. However, in other embodiments, the implement 20 may be configured as any other suitable ground engaging tool, such as a claw, and/or the like.

The linkage assembly 22 further includes a plurality of actuators for articulating components 20, 24, 26 of the linkage assembly 22. For instance, a first actuator 34A is coupled between the boom arm 24 and the chassis 14 for pivoting the boom arm 24 relative to the chassis 14. Similarly, a second actuator 34B is coupled between the boom arm 24 and the dipper arm 26 for pivoting the dipper arm 26 relative to the boom arm 24. Further, a third actuator 34C is coupled between the dipper arm 26 and the implement 20 (hereafter referred to as "bucket 20" for the sake of simplicity and without intent to limit) for pivoting the bucket 20 relative to the dipper arm 26. In one embodiment, the actuators 34A, 34B, 34C are configured as hydraulic cylinders. However, it should be appreciated that the actuators 34A, 34B, 34C may be configured as any other suitable actuators or combination of actuators. By selectively pivoting the components 24, 24, 26 of the linkage assembly 22, the bucket 20 may perform various earthmoving operations within a worksite. In particular, the bucket 20 may be actuatable over a stroke length 260, where the stroke length 260 generally extends from adjacent the tracks 16 to where the bucket 20 is fully extended away from the cab 18. As will be described below in greater detail, the actuators 34A, 34B, 34C of the work vehicle 10 may be controlled by a controller of the disclosed system to automatically perform one or more tasks of an earthmoving operation for a worksite. For instance, the actuators 34A, 34B, 34C of the work vehicle 10 may be used to determine the current fill of the bucket 20 (e.g., based on the force(s) of the actuator(s) used to actuate the bucket 20) and/or the position of the bucket 20 along the stroke length 260 and/or relative to the desired profile of the worksite.

It should be appreciated that the position of the bucket 20 along the stroke length 260 and/or relative to the desired profile of the worksite may be determined in any other suitable way. For instance, one or more position sensors (not shown) may be positioned on one or more components of the work vehicle 10 for determining and/or monitoring the position of the bucket 20. For example, the position sensor(s) may comprise accelerometer(s), gyroscope(s), inertial measurement unit(s) (IMU(s)), rotational sensor(s), proximity sensor(s), a combination of such sensors, and/or the like.

Still referring to FIG. 1, in accordance with aspects of the present invention, the work vehicle 10 may further include one or more vision-based sensors 36 configured to generate data indicative of the bucket 20 and/or the worksite. For instance, the vision-based sensor(s) 36 may be positioned such that a field of view 36A of each vision-based sensor 36 is directable towards the bucket 20 and/or the worksite. For example, the vision-based sensor(s) 36 may be supported on the operator's cab 18, the bucket 20, and/or the arm(s) 24, 26. In some embodiments, the vision-based sensor(s) 36 may be movable relative to the respective portion of the work vehicle 14 on which it is supported (e.g., the cab 18, the bucket 20, and/or arms 24, 26). More specifically, in embodiments where the vision-based sensor(s) 36 is configured to generate data indicative of the bucket 20, the vision-based sensor(s) 36 may generate data indicative of a volume of the cavity 26A of the bucket 20, the filled volume of the cavity 26A of the bucket 20, and/or wear on one or more of the teeth 26B of the bucket 20. Similarly, in embodiments where the vision-based sensor(s) 36 is configured to generate data indicative of the worksite, the vision-based sensor(s) 36 may generate data indicative of the contour of the worksite. The vision-based sensor(s) 36 may be configured as any suitable device or combination of devices for generating such data, such as a camera(s), a radio detection and ranging (RADAR) sensor(s), and/or a light detection and ranging (LIDAR) device. Such data may be used to control the operation of the bucket 20 and/or monitor the performance of the bucket 20 during an earth moving operation, as will be described in greater detail below.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, the work vehicle 10 may further include any other tools, implements, and/or components appropriate for use with a work vehicle 10.

Figure 2:
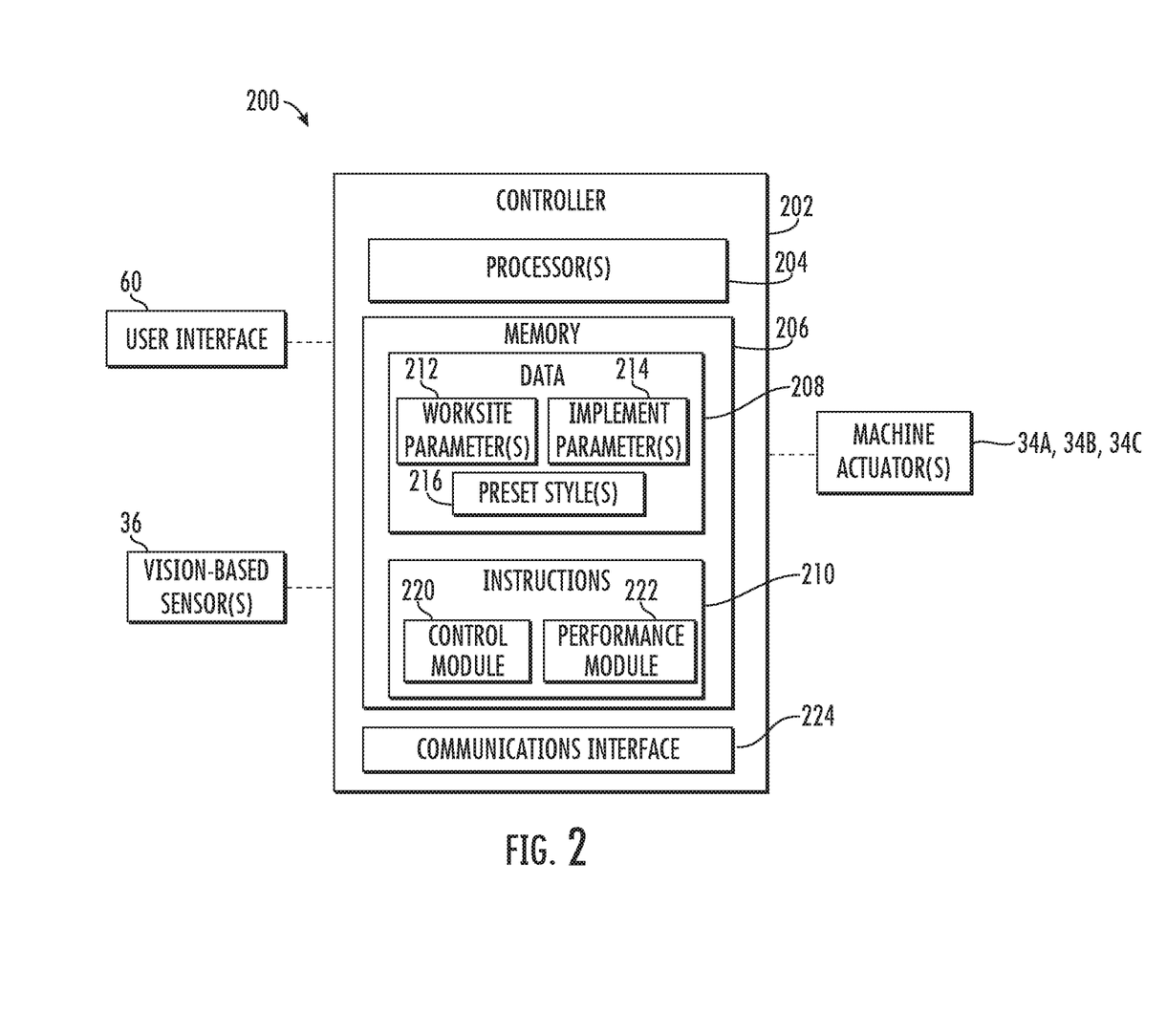
FIG. 2 illustrates a schematic view of a system for automatically performing an earthmoving operation in accordance with aspects of the present subject matter.

Referring now to FIG. 2, a schematic view of one embodiment of a system 200 for automatically performing an earthmoving operation is illustrated in accordance with aspects of the present subject matter. In general, the system 200 will be described herein with reference to the work vehicle 10 described above with reference to FIG. 1. However, it should be appreciated by those of ordinary skill in the art that the disclosed system 200 may generally be utilized with work vehicles having any suitable vehicle configuration. Additionally, it should be appreciated that, for purposes of illustration, communicative links or electrical couplings of the system 200 shown in FIG. 2 are indicated by dashed lines.

In several embodiments, the system 200 may include a controller 202 and various other components configured to be communicatively coupled to and/or controlled by the controller 202, such as a user interface (e.g., user interface 60) having one or more input devices, and/or various components of the work vehicle 10 (e.g., actuator(s) 34A, 34B, 34C). The user interface 60 described herein may include, without limitation, any combination of input and/or output devices that allow an operator to provide operator inputs to the controller 202 and/or that allow the controller 202 to provide feedback to the operator, such as a keyboard, keypad, pointing device, buttons, knobs, touch sensitive screen, mobile device, audio input device, audio output device, and/or the like. Additionally, in some embodiments, the controller 202 may be communicatively coupled to the vision-based sensors 36.

In general, the controller 202 may correspond to any suitable processor-based device(s), such as a computing device or any combination of computing devices. Thus, as shown in FIG. 2, the controller 202 may generally include one or more processor(s) 204 and associated memory devices 206 configured to perform a variety of computer-implemented functions (e.g., performing the methods, steps, algorithms, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 206 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 206 may generally be configured to store information accessible to the processor(s) 204, including data 208 that can be retrieved, manipulated, created and/or stored by the processor(s) 204 and instructions 210 that can be executed by the processor(s) 204.

It should be appreciated that the controller 202 may correspond to an existing controller for the work vehicle 10 or may correspond to a separate processing device. For instance, in one embodiment, the controller 202 may form all or part of a separate plug-in module that may be installed in operative association with the work vehicle 10 to allow for the disclosed system and method to be implemented without requiring additional software to be uploaded onto existing control devices of the work vehicle 10.

In several embodiments, the data 208 may be stored in one or more databases. For example, the memory 206 may include a worksite parameters database 212 for storing parameters of the worksite received from an operator and/or from the vision-based sensor(s) 36. For instance, the operator may be configured to input data indicative of the location of the worksite relative to the work vehicle 10 (such as by moving the articulable implement 20 to a starting point of the worksite, inputting a starting coordinate via the user interface 60, or otherwise indicating the location of the worksite). Further, data indicative of the current grade of the worksite may be received from the operator (e.g., by uploading a 3D map previously generated for the current worksite grade via the user interface 60) and/or from the vision-based sensor(s) 36. For instance, the sensor(s) 36 may be configured to continuously or periodically capture data associated with a portion of the worksite, such as immediately before or at the start of the performance of an earthmoving operation, which may be used as an indicator of the initial grade of the worksite. It should be appreciated that, as used herein, the data received from the sensor(s) 36 may include any suitable type of data that allows for the worksite to be analyzed, including images, image-related data (e.g., scan data and/or the like), RADAR data, LIDAR data, and/or any other suitable data. Additionally, data indicative of a desired grade of the worksite (e.g., trench dimensions and/or a 3D map generated for the desired worksite grade) may be received from the operator via the user interface 60. However, the data indicative of the desired grade of the worksite may be received from any other source, such as a database. The term worksite data 212 may include any suitable data transmitted to the controller 202 from the operator, the sensor(s) 36, and/or any other suitable source and stored within the worksite parameter database 212 for subsequent processing and/or analysis.

Similarly, the memory 206 may include an implement parameters database 214 for storing implement parameters of the implement(s) received from the operator and/or from the vision-based sensor(s) 36. For instance, the operator may be configured to input data indicative of the volume of the implement(s) (e.g., the dimensions of bucket 20 and/or a model of the bucket 20), the wear on the tool attachment(s) (e.g., wear on the teeth 26B of the bucket 20), and/or a stroke length of the tool attachment (e.g., stroke length 260 of bucket 20). Alternatively, or additionally, the vision-based sensor(s) 36 may be configured to generate data indicative of such parameters. It should be appreciated that the data received from the sensor(s) 36 may include any suitable type of data that allows for the implement parameters to be determined, including images, image-related data (e.g., scan data and/or the like), RADAR data, LIDAR data and/or other suitable data. The term implement data 214 may include any suitable type of data transmitted to and stored within the implement parameters database 212 for subsequent processing and/or analysis.

Additionally, the memory 206 may include a preset styles database 216 for storing preset styles for performing earthmoving operations within the worksite. In general, the preset styles indicate the priorities of an operator for performing an earthmoving operation that allows the automatic earthmoving operation to more closely simulate a manual earthmoving operation. For instance, the preset styles may indicate an implement-direction priority, an implement-emptying priority, and/or an implement-filling priority for performing the earthmoving operation. For example, the implement-direction priority may indicate that it is desirable to prioritize removing worksite materials down to the desired grade or across an entire layer along the stroke length 260. When the implement-direction priority is across the stroke length 260, the implement-emptying priority may indicate whether it desirable to empty the bucket 20 each time the bucket 20 is filled to a predetermined fill amount or to work a designated portion of the stroke length 260 before emptying the bucket 20. If the implement-emptying priority indicates that a portion of the stroke length must be worked before emptying the bucket 20, the implement-filling priority indicates whether the bucket should be filled at or before the end of the designated portion of the stroke length.

Figure 3A:
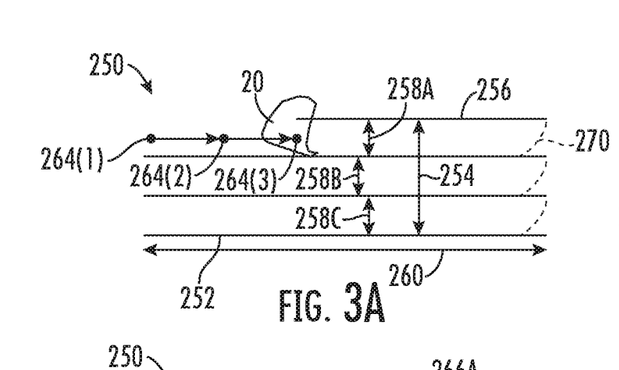
FIG. 3A illustrates a section view of a worksite in accordance with aspects of the present subject matter, particularly illustrating the worksite as a layer-centric implement-fill preset style is performed by a work vehicle.
Figure 3B:
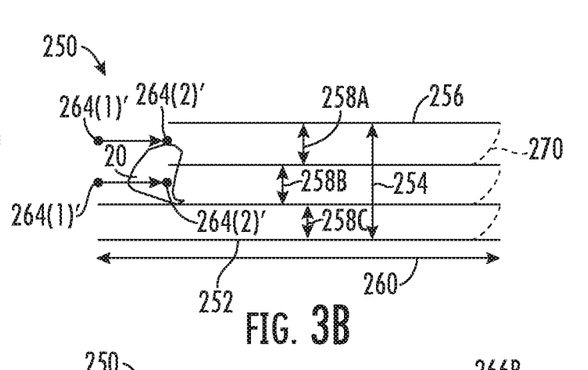
FIG. 3B illustrates a section view of a worksite in accordance with aspects of the present subject matter, particularly illustrating the worksite as a depth-centric implement-fill preset style is performed by a work vehicle.
Figure 4A:
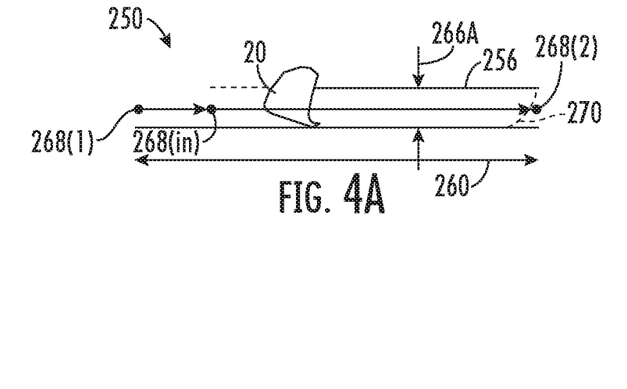
FIG. 4A illustrates a section view of a worksite in accordance with aspects of the present subject matter, particularly illustrating the worksite as a spill-centric earth-breaking preset style is performed by a work vehicle.
Figure 4B:
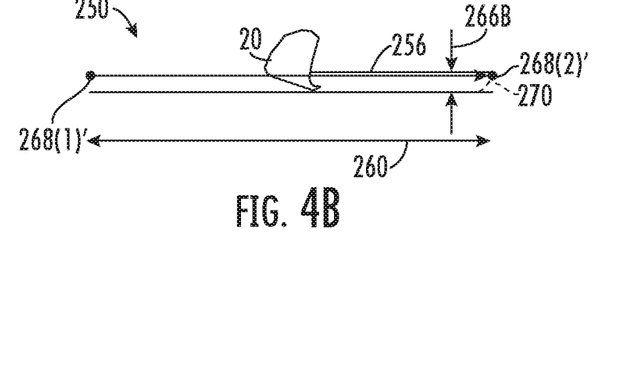
FIG. 4B illustrates a section view of a worksite in accordance with aspects of the present subject matter, particularly illustrating the worksite as a layer-centric earth-breaking preset style is performed by a work vehicle.

Referring to FIGS. 3A-4B, example embodiments of preset styles for performing earthmoving operations within a worksite are illustrated in accordance with aspects of the present subject matter. In particular, FIG. 3A illustrates a worksite as a layer-centric implement-fill style is being used to perform an earthmoving operation within a worksite. Similarly, FIG. 3B illustrates a worksite as a depth-centric implement-fill style is being used to perform an earthmoving operation within a worksite. Further, FIG. 4A illustrates a worksite as a spill-centric earth-breaking style is being used to perform an earthmoving operation within a worksite. Additionally, FIG. 4B illustrates a worksite as a layer-centric earth-breaking style is being used to perform an earthmoving operation within a worksite.

As shown in FIGS. 3A and 3B, the bucket 20 may be controlled to provide respective implement-fill styles for performing earthmoving operations at a worksite. More particularly, the worksite 250 may have a target profile 252 disposed at a target depth 254 below the initial worksite surface 256. The target profile 252 and the target depth 254 may be predetermined from a 3D model of the worksite stored within or uploaded to the controller 202 indicating the desired contours of the worksite. The bucket 20 may be articulable over at least a portion of the stroke length (e.g., stroke length 260) while performing the respective implement-fill style to reach the desired target depth 254 for the worksite. During such implement-fill styles, the implement-emptying priority is to empty the bucket 20 each time the bucket 20 is filled to a predetermined fill amount or level. The predetermined fill amount may be selected by an operator (e.g., via the user interface 60) or may otherwise be selected and stored within the preset styles database 216.

In one embodiment, the implement-fill style corresponds to a layer-centric implement-fill style in which the implement-direction priority is to remove site materials along the stroke length at a first depth before removing site materials at a deeper depth. For example, as shown in FIG. 3A, the bucket 20 may collect materials across the stroke length 260 starting from an initial stroke position 264(1) at a first depth 258A until the bucket 20 is filled to the predetermined fill amount (e.g., when the bucket 20 reaches a second stroke position 264(2)). The bucket 20 may then be emptied (e.g., at a dump location) and returned to its previous position (e.g., the second stroke position 264(2)). The bucket 20 may subsequently collect materials across the stroke length 260 starting from the second stroke position 264(2) at the first depth 258A until the bucket 20 is again filled to the predetermined fill amount (e.g., when the bucket 20 reaches a third stroke position 264(3)). The bucket 20 is again emptied and returned to the previous position (e.g., the third stroke position 264(3)). This process of collecting materials across the stroke length 260 at the first depth 258A is repeated until the worksite materials have been removed across the entire first depth 258A along the stroke length 260 for the current position of the work vehicle 10. The bucket 20 may then be controlled to remove materials one bucket at a time in the same manner along the stroke length 260 at a next depth relative to the initial worksite surface 256 (e.g., depth 258B).

In another embodiment, the implement-fill pattern corresponds to a depth-centric implement-fill style in which the implement-direction priority is to remove site materials down to the target depth along one section of the stroke length before removing site materials along another section of the stroke length. For example, as shown in FIG. 3B, the bucket 20 may first collect materials starting from an initial stroke position 264(1)' at the first depth 258A until the bucket 20 is filled to the predetermined fill amount (e.g., when the bucket 20 reaches the second stroke position 264(2)') as done in FIG. 3A. The bucket 20 may then be emptied (e.g., at a dump location). However, unlike the layer-centric implement-fill style of FIG. 3A, the bucket 20 is then controlled to remove worksite materials starting again from the first stroke position 264(1)', now at the second depth 258B, until the bucket 20 is again filled to the predetermined fill amount (e.g., when the bucket 20 reaches the second stroke position 264(2)' at the second depth 258B) and emptied. This process of collecting materials along one section of the stroke length 260 at increasing depths is repeated until the worksite materials have been removed down to the target depth 252. The bucket 20 may then be controlled to remove materials one bucket at a time in the same manner down to the target depth 252 along an adjacent section of the stroke length (e.g., a section starting at the second stroke position 264(2)' at the first depth 258A).

It should be appreciated that the depth(s) (258A, 258B, 258C) at which the bucket 20 performs such implement-fill styles may, in one embodiment, correspond to a depth of the bucket 20. However, the depth(s) (258A, 258B, 258C) at which the bucket 20 performs such implement-fill styles may correspond to any other suitable depth. For instance, the depth(s) 258A, 258B, 258C may be selected by an operator via the user interface 60.

As shown in FIGS. 4A and 4B, the implement-direction priority is to remove site materials along the stroke length, however, unlike the layer-centric implement-fill style of FIG. 3A, the implement-emptying priority is to empty the bucket 20 only after the bucket 20 works an entire designated portion of the stroke length 260, which helps to break up or remove compacted top layers of the site. Thus, subsequent earthmoving operations may be performed with considerably less force.

In one embodiment, the earth-breaking style corresponds to a spill-over earth-breaking style in which the implement-filling priority is to fill the implement before the end of the designated portion of the stroke length. For example, as shown in FIG. 4A, the bucket 20 may collect materials at the first depth 266A across a portion of the stroke length 260 between an initial stroke position 268(1) and a second stroke position 268(2). In the embodiment shown, the portion of the stroke length 260 traversed between the initial and second stroke positions 268(1), 268(2) corresponds to an entirety of the stroke length 260. However, in other embodiments, the portion of the stroke length 260 may cover less than the entire stroke length 260. The first depth 266A may be selected such that the bucket 20 is filled before the bucket 20 reaches the second stroke position 268(2) (e.g., when the bucket reaches an intermediate stroke position 268(in)). In one embodiment, the first depth 266A may be selected by an operator or may be predetermined by the controller 202 based on at least one of the portion of the stroke length 260 or the capacity of the cavity 26A. As such, worksite materials flow around the filled bucket 20 (as indicated with a dashed line) as the bucket 20 moves between the intermediate stroke position 268(in) and the second stroke position 268(2).

In another embodiment, the earth-breaking style corresponds to a layer-centric earth-breaking style in which the implement-filling priority is to fill the implement to the predetermined fill amount or level when the implement reaches the end of the designated portion of the stroke length. For example, as shown in FIG. 4B, the bucket 20 may collect materials at the second depth 266B across a portion of the stroke length 260 between an initial stroke position 268(1)' and a second stroke position 268(2)'. Again, the portion of the stroke length 260 between the initial and second stroke positions 268(1)', 268(2)' essentially corresponds to the entire stroke length 260 of the bucket 20. However, the portion of the stroke length 260 between the initial and second stroke positions 268(1)', 268(2)' may correspond to less than the entire stroke length 260. The second depth 266B may be selected such that the bucket 20 is filled to the predetermined fill amount when the bucket 20 reaches the second stroke position 268(2)'. The second depth 266B may be selected by the operator via the user interface 60 or may be predetermined by the controller 202 based on the portion of the stroke length 260 and the capacity of the cavity 26A. The bucket 20 may be emptied after reaching the second stroke position 268(2)'. By filling the bucket 20 at the end of the stroke length 260, the bucket 20 may remove the entire top layer across the designated portion of the stroke length 260.

It should be appreciated that, when the bucket 20 begins to encroach upon the end of the stroke length 260 closest to the tracks 16 (FIG. 1) during any of the above disclosed styles, the bucket 20 is directed along a safety path 270. The safety path 270 is designed such that the bucket 20 does not contact the tracks 16 (FIG. 1) or any other portion of the work vehicle 10 (e.g., cab 18) when reaching the end of the stroke length 260 closest to the tracks 16. In some embodiments, the safety path 270 may be the same for each depth layer (e.g., depths 258A, 258B, 258C) as shown. However, in other embodiments, the safety path 270 may be different for each depth layer (e.g., depths 258A, 258B, 258C). For example, the safety path 270 may begin earlier along the stroke length 260 and/or may be steeper for deeper depths.

Referring back to FIG. 2, in some embodiments, the instructions 210 stored within the memory 206 of the controller 202 may be executed by the processor(s) 204 to implement a control module 220. The control module 220 may generally be configured to control the work vehicle 10 to perform an automatic earthmoving operation based on the selected one of the preset earthmoving styles stored in the preset styles database 216. The control module 220 may more particularly be configured to control the operation of one or more components of the work vehicle 14, such as by controlling the operation of one or more of the actuators 34A, 34B, 34C to control the implement 20 based on the selected preset earthmoving style. For instance, the control module 220 may monitor one or more of the fill of the bucket, the position of the implement 20 along the stroke length (or designated portion of the stroke length), and the position of the implement 20 relative to the desired grade of the worksite (e.g., based on data from at least one of the vision-based sensor(s) or the actuators 34A, 34B, 34C) to control the implement 20 based on the selected preset earthmoving style.

Additionally, the instructions 210 stored within the memory 206 of the controller 202 may be executed by the processor(s) 204 to implement a performance module 222. In general, the performance module 222 may be configured to assess the worksite data 212 and the implement data 214 deriving from the sensor(s) 36 to determine a performance of the implement 20 in performing the automatic earthmoving operation. For instance, as indicative above, in one embodiment, data may be captured corresponding to the current grade of the worksite. In such embodiment, the performance module 222 may be configured to compare the current grade of the worksite to the desired or expected grade of the worksite to determine a percentage completion, for example, to assess the performance of the implement 20. Similarly, in one embodiment, data may be captured corresponding to the wear on the implement (e.g., on the teeth 20B). In such embodiment, the performance module 222 may be configured to compare the wear on the implement to a threshold wear to assess the efficiency of the implement in performing the earthmoving operation.

Moreover, as shown in FIG. 2, the controller 202 may also include a communications interface 224 to provide a means for the controller 202 to communicate with any of the various other system components described herein. For instance, one or more communicative links or interfaces (e.g., one or more data buses) may be provided between the communications interface 224 and the user interface 60 to allow operator inputs to be received by the controller 202 and/or to allow the controller 202 to control the operation of one or more components of the user interface 60 to present one or more ground engaging styles and/or one or more indicators of the progress of the earthmoving operation to the operator. Similarly, one or more communicative links or interfaces (e.g., one or more data buses) may be provided between the communications interface 224 and the sensor(s) 36 to allow data transmitted from the sensor(s) 36 to be received by the controller 202. Additionally, one or more communicative links or interfaces (e.g., one or more data buses) may be provided between the communications interface 224 and the machine actuator(s) 34A, 34B, 34C for allowing the controller 202 to control the operation of one or more operations of the actuator(s) 34A, 34B, 34C.

Figure 5:
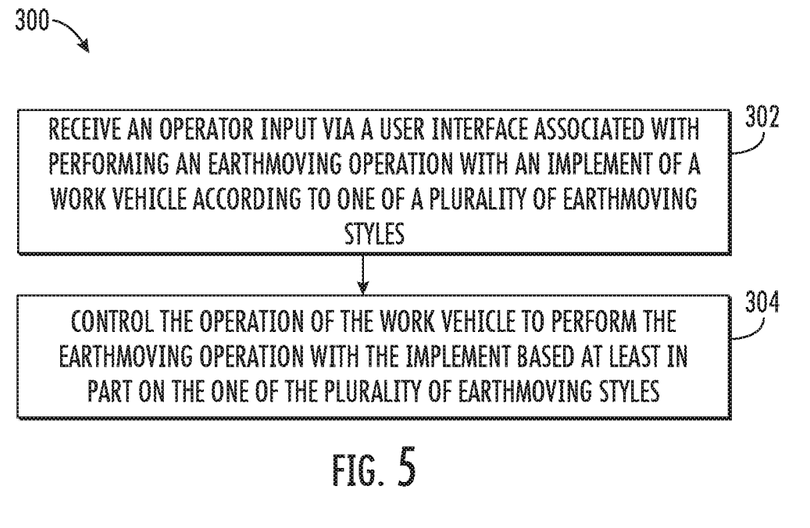
FIG. 5 illustrates a method for automatically performing an earthmoving operation in accordance with aspects of the present subject matter.

Referring now to FIG. 5, a flow diagram of one embodiment of a method 300 for automatically performing an earthmoving operation is illustrated in accordance with aspects of the present subject matter. In general, the method 300 will be described herein with reference to the work vehicle 10 shown in FIG. 1, as well as the various system components of the system 200 shown in FIG. 2. However, it should be appreciated that the disclosed method 300 may be implemented with work vehicles having any other suitable configurations, and/or within systems having any other suitable system configuration. In addition, although FIG. 5 depicts steps performed in a particular order for purposes of illustration and discussion, the method steps discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving an operator input via a user interface associated with performing an earthmoving operation with an implement of a work vehicle according to one of a plurality of earthmoving styles. For example, the controller 202 may receive an input from an operator of the work vehicle 10 via a user interface (e.g., user interface 60) selecting one of the plurality of preset earthmoving styles for performing an earthmoving operation stored in the preset styles database 216 of the memory 206. For instance, as described above, the operator may select one of a layer-centric implement-fill preset style, a depth-centric implement-fill preset style, a spill-centric earth-breaking preset style, or a layer-centric earth-breaking preset style.

Additionally, at (304), the method 300 may include controlling the operation of the work vehicle to perform the earthmoving operation with the implement within the worksite based at least in part on the one of the plurality of earthmoving styles. For instance, as indicated above, the controller 202 may be configured to control the actuator(s) 34A, 34B, 34C associated with the implement (e.g., bucket 20) to perform an earthmoving operation according to the selected one of the plurality of preset earthmoving styles to create a desired profile of the worksite.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for automatically performing an earthmoving operation, comprising:
   a work vehicle having an implement, the implement being articulable by the work vehicle relative to a chassis of the work vehicle over a stroke length extending outwardly from the chassis and over a range of depths;
   a user interface; and
   a controller communicatively coupled to the user interface, the controller being configured to:
      receive a target profile indicating a desired contour of a worksite after performing an earthmoving operation with the work vehicle, the target profile being at least partially below an initial worksite surface;
      receive an operator input via the user interface, the operator input being associated with selecting one of a plurality of earthmoving styles for performing the earthmoving operation with the implement of the work vehicle to reach the target profile, each of the plurality of earthmoving styles being associated with a respective, repetitive pattern to move the implement relative to the chassis at a depth of the range of depths and along a length of the stroke length to fill the implement to a predetermined fill amount before emptying the implement; and
      automatically control an operation of the work vehicle to perform the earthmoving operation with the implement based at least in part on the one of the plurality of earthmoving styles to reach the target profile.

2. The system of claim 1, wherein the one of the plurality of earthmoving styles comprises an implement-fill style associated with emptying the implement each time the implement reaches the predetermined fill amount.

3. The system of claim 2, wherein the implement-fill style comprises a layer-centric implement-fill style during which the controller is configured to control the operation of the implement to remove a first layer of worksite materials extending to the depth along the stroke length before removing a second layer of worksite materials positioned below the first layer of worksite materials, with the implement reaching the predetermined fill amount at least once before removing the first layer of the worksite materials along the stroke length.

4. The system of claim 2, wherein the implement-fill style comprises a depth-centric implement-fill style during which the controller is configured to control the operation of the implement to remove worksite materials down to a target depth along a given section of the stroke length before removing worksite materials along another section of the stroke length, with the implement reaching the predetermined fill amount at least once before removing the worksite materials down to the target depth, the target depth being the depth.

5. The system of claim 1, wherein the one of the plurality of earthmoving styles comprises an earth-breaking style associated with moving the implement across the length equivalent to a predetermined portion of the stroke length prior to emptying the implement.

6. The system of claim 5, wherein the earth-breaking style comprises a spill-over earth-breaking style during which the controller is configured to control the operation of the implement to loosen worksite materials down to the depth along a full pass across the predetermined portion of the stroke length, the depth being selected such that the implement reaches the predetermined fill amount before the implement reaches an end of the predetermined portion of the stroke length.

7. The system of claim 5, wherein the earth-breaking style comprises a layer-centric earth-breaking style during which the controller is configured to control the operation of the implement to loosen worksite materials down to the depth along a full pass across the predetermined portion of the stroke length, the depth being selected such that the implement reaches the predetermined fill amount when the implement reaches an end of the predetermined portion of the stroke length.

8. The system of claim 1, wherein each of the plurality of earthmoving styles is predetermined and stored within a memory of the controller,
wherein the plurality of earthmoving styles includes at least one implement-fill style and at least one earth-breaking style, each of the at least one implement-fill style prioritizing the depth over the length of the stroke length for moving the implement and being associated with emptying the implement each time the implement reaches the predetermined fill amount, each of the at least one earth-breaking style prioritizing the length of the stroke length over the depth for moving the implement and being associated with moving the implement across the length equivalent to a predetermined portion of the stroke length prior to emptying the implement.

9. The system of claim 1, the controller being further configured to receive an input indicative of at least one parameter of the implement, the controller being further configured to control the operation of the work vehicle based at least in part on the at least one parameter of the implement.

10. The system of claim 9, further comprising at least one vision-based sensor communicatively coupled to the controller, wherein the controller is configured to receive the input indicative of the at least one parameter of the implement from the at least one vision-based sensor.

11. The system of claim 9, wherein the controller is configured to receive the input indicative of the at least one parameter of the implement from the user interface.

12. The system of claim 1, wherein the implement is part of a linkage assembly, the linkage assembly including a boom arm pivotably coupled to the chassis and a dipper arm pivotably coupled to the boom arm, with the implement being pivotably coupled to the dipper arm.

13. A method for automatically performing an earthmoving operation with a work vehicle, the work vehicle having an implement that is articulable relative to a chassis of the work vehicle over a stroke length extending outwardly from the chassis and over a range of depths, the method comprising:
receiving, with a computing device, a target profile indicating a desired contour of a worksite after performing an earthmoving operation with the work vehicle, the target profile being at least partially below an initial worksite surface;
receiving, with the computing device, an operator input via a user interface, the operator input being associated with selecting one of a plurality of earthmoving styles for performing an earthmoving operation with the implement of the work vehicle to reach the target profile, each of the plurality of earthmoving styles being associated with a respective, repetitive pattern to move the implement relative to the chassis at a depth of the range of depths and along a length of the stroke length to fill the implement to a predetermined fill amount before emptying the implement; and
automatically controlling, with the computing device, an operation of the work vehicle to perform the earthmoving operation with the implement based at least in part on the one of the plurality of earthmoving styles to reach the target profile.

14. The method of claim 13, wherein the one of the plurality of earthmoving styles comprises an implement-fill style associated with emptying the implement each time the implement reaches the predetermined fill amount.

15. The method of claim 14, wherein the implement-fill style comprises a layer-centric implement-fill style during which controlling the operation of the work vehicle to perform the earthmoving operation comprises controlling the operation of the work vehicle to remove a first layer of worksite materials extending to the depth along the stroke length before removing a second layer of worksite materials positioned below the first layer of worksite materials, with the implement reaching the predetermined fill amount at least once before removing the first layer of the worksite materials along the stroke length.

16. The method of claim 14, wherein the implement-fill style comprises a depth-centric implement-fill style during which controlling the operation of the work vehicle to perform the earthmoving operation comprises controlling the operation of the work vehicle to remove worksite materials down to a target depth along a given section of the stroke length before removing worksite materials along another section of the stroke length, with the implement reaching the predetermined fill amount at least once before removing the worksite materials down to the target depth, the target depth being the depth.

17. The method of claim 13, wherein the one of the plurality of earthmoving styles comprises an earth-breaking style associated with moving the implement across the length equivalent to a predetermined portion of the stroke length prior to emptying the implement.

18. The method of claim 17, wherein the earth-breaking style comprises a spill-over earth-breaking style during which controlling the operation of the work vehicle to perform the earthmoving operation comprises controlling the operation of the work vehicle to loosen worksite materials down to the depth along a full pass across the predetermined portion of the stroke length, the depth being selected such that the implement reaches the predetermined fill amount before the implement reaches an end of the predetermined portion of the stroke length.

19. The method of claim 17, wherein the earth-breaking style comprises a layer-centric earth-breaking style during which controlling the operation of the work vehicle to perform the earthmoving operation comprises controlling the operation of the work vehicle to loosen worksite materials down to the depth along a full pass across the predetermined portion of the stroke length, the depth being selected such that the implement reaches the predetermined fill amount when the implement reaches an end of the predetermined portion of the stroke length.

20. The method of claim 13, wherein the plurality of earthmoving styles includes at least one implement-fill style and at least one earth-breaking style, each of the at least one implement-fill style prioritizing the depth over the length of the stroke length and being associated with emptying the implement each time the implement reaches the predetermined fill amount, each of the at least one earth-breaking style prioritizing the length of the stroke length over the depth and being associated with moving the implement across the length equivalent to a predetermined portion of the stroke length prior to emptying the implement.

* * * * *